(12) United States Patent
Little (10) Patent No.: US 9,077,750 B2
(45) Date of Patent: Jul. 7, 2015

(54) USING FORUMS AS A MESSAGE TRANSPORT IN AN ENTERPRISE SERVICE BUS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 247 days.

(21) Appl. No.: 12/395,486

(22) Filed: Feb. 27, 2009

(65) Prior Publication Data

US 2010/0223344 A1 Sep. 2, 2010

(51) Int. Cl.
*H04L 29/08* (2006.01)

(52) U.S. Cl.
CPC ............... *H04L 67/16* (2013.01); *H04L 67/02* (2013.01)

(58) Field of Classification Search
CPC ................................ H04L 67/16; H04L 67/02
USPC .................................................. 709/203, 206
See application file for complete search history.

(56) References Cited

U.S. PATENT DOCUMENTS

| | | | |
|---|---|---|---|
| 6,510,429 B1 * | 1/2003 | Todd | 705/36 R |
| 7,080,078 B1 * | 7/2006 | Slaughter et al. | 1/1 |
| 7,747,705 B1 * | 6/2010 | Raja | 709/219 |
| 7,797,306 B1 * | 9/2010 | Pather et al. | 707/714 |
| 7,802,264 B2 | 9/2010 | Robertson et al. | |
| 7,853,643 B1 | 12/2010 | Martinez et al. | |
| 7,966,320 B2 | 6/2011 | Roshen | |
| 8,112,262 B1 * | 2/2012 | Michelsen | 703/13 |
| 8,832,220 B2 | 9/2014 | Petersen | |
| 2001/0013051 A1 * | 8/2001 | Nakada et al. | 709/202 |
| 2002/0198943 A1 * | 12/2002 | Zhuang et al. | 709/206 |
| 2003/0236894 A1 * | 12/2003 | Herley | 709/229 |
| 2004/0028212 A1 * | 2/2004 | Lok et al. | 379/265.09 |
| 2004/0128673 A1 * | 7/2004 | Fuchs et al. | 719/310 |
| 2006/0031533 A1 * | 2/2006 | Goodman et al. | 709/227 |
| 2006/0069771 A1 * | 3/2006 | Gissel et al. | 709/224 |
| 2006/0200804 A1 * | 9/2006 | Cyr et al. | 717/120 |
| 2006/0217126 A1 | 9/2006 | Sohm et al. | |
| 2006/0265489 A1 | 11/2006 | Moore | |
| 2006/0265508 A1 | 11/2006 | Angel | |
| 2007/0005746 A1 * | 1/2007 | Roe et al. | 709/223 |
| 2007/0022174 A1 | 1/2007 | Issa | |
| 2007/0100836 A1 | 5/2007 | Eichstaedt et al. | |
| 2007/0112947 A1 | 5/2007 | Anderson et al. | |
| 2007/0118394 A1 | 5/2007 | Cahoon | |
| 2007/0121820 A1 | 5/2007 | Ahmann | |
| 2007/0162421 A1 * | 7/2007 | Pang et al. | 707/2 |
| 2007/0168228 A1 | 7/2007 | Lawless | |
| 2007/0219857 A1 | 9/2007 | Seymour et al. | |

(Continued)

OTHER PUBLICATIONS

"JBossESB Requirements and Architecture, Version: 0.3," May 2, 2006, 12 pages.

(Continued)

*Primary Examiner* — Philip Chea
*Assistant Examiner* — Wing Ma
(74) *Attorney, Agent, or Firm* — Lowenstein Sandler LLP (57) ABSTRACT

A forum service that is hosted by a server in an enterprise service bus receives a message from a client, the message being directed to a service in the enterprise service bus. The forum service acts as a message transport in the enterprise service bus. A thread is generated in a forum managed by the forum service for communications between the client and the service. The message is stored in the thread. The service is notified of the message, wherein the service to receive the message, process the message and post a response message to the thread.

12 Claims, 4 Drawing Sheets

(56) References Cited

U.S. PATENT DOCUMENTS

| | | | |
|---|---|---|---|
| 2007/0286100 A1 | 12/2007 | Saaranen et al. | |
| 2008/0016217 A1 | 1/2008 | Astley et al. | |
| 2008/0034040 A1 | 2/2008 | Wherry et al. | |
| 2008/0103800 A1 | 5/2008 | Domenikos et al. | |
| 2008/0104258 A1 | 5/2008 | O'Neil et al. | |
| 2008/0114847 A1* | 5/2008 | Ma et al. | 709/206 |
| 2008/0120380 A1* | 5/2008 | Boyd et al. | 709/206 |
| 2008/0294794 A1* | 11/2008 | Darugar et al. | 709/238 |
| 2009/0018998 A1* | 1/2009 | Patten et al. | 707/3 |
| 2009/0055467 A1 | 2/2009 | Petersen | |
| 2009/0063991 A1* | 3/2009 | Baron et al. | 715/751 |
| 2009/0117925 A1 | 5/2009 | DeBonis et al. | |
| 2009/0125628 A1 | 5/2009 | Dahlen | |
| 2009/0193096 A1* | 7/2009 | Boyer et al. | 709/217 |
| 2009/0228563 A1* | 9/2009 | Jones et al. | 709/206 |
| 2009/0228584 A1 | 9/2009 | Maes et al. | |
| 2010/0023587 A1* | 1/2010 | Fletcher et al. | 709/206 |
| 2012/0240147 A1 | 9/2012 | Rodriguez | |

OTHER PUBLICATIONS

King, Erik, "Perpetual Enterprise Management Service (PEMS) for Next Generation SOA-based Command & Control Systems", Jun. 2005, 49 pages.

Snell, James, "An Overview of the Atom 1.0 Syndication Format", Aug. 2, 2005. 9 pages. IBM http://www.ibm.com/developerworks/xml/library/x-atom10.html.

Snell, James, "Getting to Know the Atom Publishing Protocol, Part I: Create and Edit Web Resources with the Atom Publishing Protocol", Oct. 17, 2006. 9 pages. IBM http://www.ibm.com/developerworks/library/x-atompp1/.

Snell, James, "Getting to Know the Atom Publishing Protocol, Part 2: Put the Atom Publishing Protocol to Work", Nov. 7, 2006. 10 pages. IBM http://www.ibm.com/developerworks/library/x-atompp2/.

"Why ESB and SOA?" Version 0.3, Date: Jan. 27, 2006, 7 pages.

Red Hat, Inc. Office Action for U.S. Appl. No. 12/201,949 mailed Aug. 2, 2010.

Red Hat, Inc. Final Office Action for U.S. Appl. No. 12/201,949 mailed Dec. 29, 2010.

Office Action for U.S. Appl. No. 12/201,949 mailed Oct. 24, 2012.

Final Office Action for U.S. Appl. No. 12/201,949 mailed Mar. 21, 2013.

Advisory Action for U.S. Appl. No. 12/201,949 mailed Jun. 13, 2013.

Office Action for U.S. Appl. No. 12/201,949 mailed Sep. 12, 2013.

Office Action for U.S. Appl. No. 12/201,949 mailed Feb. 21, 2014.

Advisory Action for U.S. Appl. No. 12/201,949 mailed Apr. 30, 2014.

Notice of Allowance for U.S. Appl. No. 12/201,949 mailed Nov. 5, 2014.

* cited by examiner

USING FORUMS AS A MESSAGE TRANSPORT IN AN ENTERPRISE SERVICE BUS

TECHNICAL FIELD

Embodiments of the present invention relate to message distribution in distributed systems, and more specifically to using forums as a message transport in an enterprise service bus.

BACKGROUND

A messaging infrastructure is a key component in a distributed computing system. The messaging infrastructure is responsible for enabling communication (e.g., the sending and receiving of messages) between disparate components in the distributed computing system. The messaging infrastructure uses one or more message transports to send messages between the disparate components. In a conventional messaging infrastructure, such message transports include, for example, extensible markup language (XML), hypertext transport protocol (HTTP), transmission control protocol/internet protocol (TCP/IP), email and Java message service (JMS).

One limitation shared by the various message transports used in conventional messaging infrastructures is that these message transports lack durability. A message is generated, sent, received, and consumed. Once the message has been consumed, there is no record that the message ever existed. To remedy this, some conventional distributed computing systems use a message store. The message store intercepts and generates copies of all messages sent through the messaging infrastructure. These copies are then stored in the message store. The message store is an additional service that must be maintained, and adds complexity to the distributed computing system.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for using a forum as a message transport in a distributed computing system. In one embodiment, a forum service that is hosted by a server in an enterprise service bus receives a message from a client. The message may be directed to a service in the enterprise service bus. A thread is generated in a forum managed by the forum service for communications between the client and the service, and the message is stored in the thread. The service can be notified of the thread and/or of the message. In one embodiment, the message is sent to the service upon the message being stored in the thread. Alternatively, the message may be sent to the service in response to the service polling the forum.

The service receives the message, processes the message and posts a response message to the thread. The forum service receives the response message and stores it in the thread. The forum service can then notify the client of the response message. In one embodiment, the response message is sent to the client upon the response message being stored to the thread. Alternatively, the response message may be sent to the client in response to the client polling the forum. The client may then receive and process the response message.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "generating", "storing", "receiving", "posting", "polling" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 1:
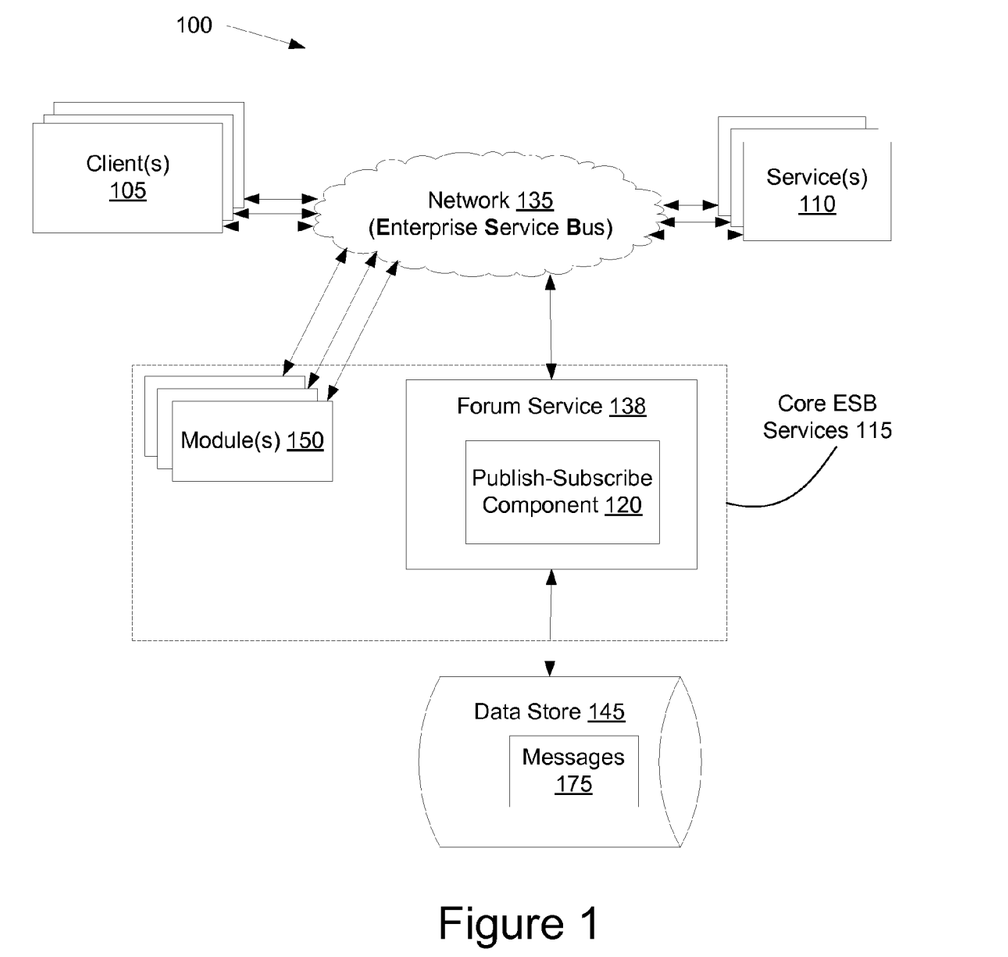
FIG. 1 illustrates an exemplary distributed system, in which embodiments of the present invention may operate.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include clients 105 and services 110, connected via a network 135. The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based messaging engine that provides services for more complex architectures. The ESB provides an infrastructure that links together services 110 and clients 105 to enable distributed applications and processes. In one embodiment, the ESB includes components that are installed on one or more of the clients 105 and services 110. In another embodiment, rather than including components installed on clients 105 and services 110, the ESB may rely on components that are installed on machines interposed between the clients 105 and the services 110. Alternatively, the ESB may include a combination of components that are installed on the clients 105 and services 110, and components that are external to the clients 105 and services 110. The ESB may be implemented to facilitate an SOA. In one embodiment, the ESB is a single bus that logically interconnects all available services 110 and clients 105. Alternatively, the ESB may include multiple busses, each of which may logically interconnect different services and/or clients.

Clients 105 may be, for example, personal computers (PC), palm-sized computing devices, personal digital assistants (PDA), etc. Clients 105 may also be applications run on a PC, server, database, etc. In the SOA, clients 105 include applications that access services 110. Clients 105 may be fat clients (clients that perform local processing and data storage), thin clients (clients that perform minimal or no local processing and minimal to no data storage), and/or hybrid clients (clients that perform local processing but little to no data storage).

Services 110 may be discretely defined sets of contiguous and autonomous functionality (e.g., business functionality, technical functionality, etc.). Services 110 may be resident on personal computers (PC), servers, routers, etc. Each service 110 may represent a process, activity or other resource that can be accessed and used by other services or clients on network 135. Each service 110 may be independent of other services 110, and may be accessed without knowledge of its underlying platform implementation.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

In one embodiment, the ESB includes a collection of core ESB services 115. The core ESB services 115 are specialized services that enhance and/or enable functionality of the ESB. Messages can be directed towards any of the core ESB services 115, and/or the core ESB services 115 can act on messages that flow through the ESB. Any of the core ESB services 115 may be hosted by one or more general purpose computing devices (e.g., personal computer or server) and/or special purpose computing devices configured to act on messages that flow between message producers (e.g., clients or services) and message consumers (e.g., clients or services) within the ESB.

The core ESB services 115 may include one or more modules 150, each of which may be a service of the ESB. Examples of modules 150 include modules that provide services for redirecting a message from an original intended endpoint, splitting a message into multiple messages, combining multiple messages into a single message, transforming messages from a first format to a second format, applying rules to a message, etc. Each module 150 may provide a service to clients 105 and/or services 110 of the distributed computing system 100.

In one embodiment, the core ESB services 115 include a forum service 138. Forum service 138 is a service that manages user generated content. The forum service 138 provides one or more forums that are persistent discussion areas (e.g., a message board) to which clients 105 and services 110 may post messages, and from which clients 105 and services 110 may read messages. A forum may be hierarchically organized. For example, a forum may be divided into multiple subjects/topics, which may be further subdivided into subtopics. Within each topic or subtopic, forum members may start new threads (conversations) for discussing a particular topic (e.g., for exchanging messages associated with a particular session or transaction between, for example, a client and a service). Each client and service may be a member of the forum or forums provided by the forum service 138. Just a few examples of forum service software include PHPBB®, INVISION POWER BOARD, SNITZ FORUMS™, WEB WIZ FORUMS®, and IKONBOARD.

The forum service 138 acts as a message transport for the ESB. Specifically, clients 105 may post messages to the forum or forums provided by the forum service 138 to initiate the use of a particular service. Services 110 may perform actions in response to the posted messages, and post response messages with output generated from the performed actions. Clients 105 may then receive the response messages (including the output).

In one embodiment, clients and services post messages to the forum service using standard hypertext transfer protocol (HTTP) and hypertext markup language (HTML) commands (e.g., get and post commands). Posted messages may include standard HTML or HTTP formatted text. Additionally, posted messages may include attachments such as images, audio files, binary files (e.g., executable files), etc. Therefore, posted messages can include all information necessary for a service to perform its functions.

The forum service 138 offers a number of advantages over traditional message transports. A key benefit of the forum service 138 as a message transport is that the forum service 138 has a built in message storage and archiving capability. Therefore, there is no need for the core ESB services 115 to include a separate module 150 that copies and stores messages flowing through the ESB (e.g., a message store core ESB service).

The forum service 138 may be connected to a data store 145, on which forum service 138 stores all messages 175 that are posted to the forum service 138. The data store 145 may include a file system, backend database, or other data arrangement. The data store 145 may include volatile memory (e.g., random access memory (RAM)) and/or nonvolatile memory (e.g, nonvolatile RAM, Flash memory, hard disk drive, etc.). In one embodiment, data store 145 is internal to a server that hosts the forum service 138. Alternatively, data store 145 may be external to the server that hosts the forum service 138, and connected with the server either directly or via a network.

In one embodiment, the core ESB services 115 include a separate forum service 138 for each service. In another embodiment, the core ESB service 115 includes a separate forum service 138 for each category of service (e.g., a single forum service for all flight booking services, a single forum service for all banking services, etc.). Alternatively, a single forum service 138 may be used for all services on the ESB.

The forum service 138 may include multiple forum topics, each of which may in turn include multiple threads. In one embodiment, each forum topic is for a particular service. Alternatively, each forum topic may be for a particular type of service (e.g., banking services). In such an instance, forum topics may include sub topics, each of which is associated with a particular service.

To send a message to a particular service using the forum service as a message transport, a client may post the message to a topic or subtopic associated with that particular service. Alternatively, the client may post a message to a topic that is associated with a category of services. The forum service 138 may then assign the message to a service that belongs to the category of service, and generate a new thread in a subtopic of the assigned service.

In one embodiment, a new thread is generated in an appropriate topic each time a client attempts to use a service (e.g., each time a new session is established between that client and the service). For example, if a client attempts to book a flight to Singapore using a flight booking service, the client may post a message to a forum topic associated with that flight booking service. A thread can be generated in the forum topic, and the message may be stored in the thread. If the same client then attempts to book a flight to Mexico using the same flight booking service, the client may post a new message to the topic. A new thread may be generated, and the new message may be stored in the new thread.

In another embodiment, a new thread is generated when a client attempts to use a service that the client has never used before. In such an embodiment, on subsequent uses of the service, new messages and response messages get added to the same thread. Messages may also be grouped in threads according to other criteria. For example, all messages exchanged between a particular service and a particular client in a single day (or other specified time period) may be stored to a thread. Messages exchanged between the same service and client on a subsequent day (or after the specified time period) may be stored to a different thread.

The forum service 138 may include security and/or authentication capabilities. Security and authentication may be applied at the forum level, topic level, subtopic level or thread level. For example, each time a client or service attempts to access a particular thread or topic, the service or client can be required to provide a username and password. An access control list may also be used that only permits access to, for example, a thread from clients or services having a particular network address. Security and authentication may be enabled or disabled for particular threads, topics, etc. based on requirements of an associated service. Moreover, different types of security and/or authentication may be used for different topics, threads, and so on.

Once messages are posted to the forum service 138, the intended recipients of those messages need somehow to access the messages. In one embodiment, clients and services actively poll the forum service 138 for new messages. A client may poll the forum service 138 periodically once that client has posted a message to a topic of the forum service 138. That client may continue to poll the forum service 138 until a response message has been posted to the forum service 138 in the appropriate thread and/or topic. A Service 110 may poll the forum service 138 periodically to determine if any messages have been posted to a topic associated with that service. If a message has been posted to the appropriate topic and/or thread, the new message can then be downloaded to the polling service or client.

In one embodiment, new messages are bundled and sent to a service or client in a single communication. This may minimize network traffic. For example, if a client 105 has posted messages to multiple different topics, and multiple response messages are ready for the client, then those response messages may be bundled into a single communication and sent to the client in response to the polling. Similarly, if multiple clients have posted messages directed to a particular service since the service last polled the forum service 138, each of those messages may be bundled into a single communication to the service.

In one embodiment, the forum service 138 automatically notifies clients and/or services when new messages directed to those clients/services are available. The forum service 138 may also send the body of the messages (including any attachments) to their intended recipients automatically along with the notification. In one embodiment, the forum service sends notifications and/or message contents using email. Alternatively, or in addition, the forum service may send notifications and/or message contents using a publish subscribe model. In a publish-subscribe model, once a client or service publishes a message to a topic, the message is propagated to all entities that are authorized to receive the message (subscribers).

To implement the publish-subscribe model, the forum service 138 may include a publish-subscribe component 120. The publish-subscribe component 120 may include multiple different syndication feeds (otherwise known as channels or nodes). Each syndication feed may be associated with a distinct forum, topic, subtopic or thread. For example, a first syndication feed may be associated with a flight reservation services topic, a second syndication feed may be associated with banking services topic, a third syndication feed may be associated with retail services topic, and so on.

In one embodiment, a new syndication feed is established each time a new thread is generated. Both the service and the client may be subscribed to the new syndication feed automatically. Therefore, whenever new posts are made to the thread, the service and/or client may be notified of the post.

In one embodiment, the publish-subscribe component 120 distributes entries of the syndication feeds 160 to subscribers using the Atom Publishing Protocol (AtomPub) or Really Simple Syndication (RSS) protocol. Both the Atom Publishing Protocol and the RSS protocol are application-level protocols for content publishing and management using HTTP and extensible markup language (XML). These protocols provide facilities for creating, editing, deleting and distributing resources. The Atom Publishing Protocol and the RSS protocol enable resources to be managed and published as collections of resources, which may or may not be hierarchically arranged.

In one embodiment, the forum service 138 includes a service registry topic. The service registry topic may include subtopics for different categories of services and/or for individual services. The subtopics may in turn include additional subtopics, each being associated with a distinct service. Alternatively, the ESB may include an independent service registry forum. Such an independent service registry forum may include a separate topic for each category of service and subtopics for each individual service.

The service registry topic and/or forum provides information on available services 110, 115 to clients 105. A client 105 may query the service registry topic/forum to determine one or more services 110, 115 that are available on the distributed computing system 100, and how to contact the service 110, 115 (e.g., via an HTTP service address).

Services 110 may post messages to an appropriate topic or subtopic in the service registry forum or topic when the services 110 become available and/or when information about the services 110 changes. In one embodiment, services 110 periodically post messages to indicate that the services 110 are still available. Messages posted to the service registry topic/forum may include a service availability status, a formal service description (e.g., identifying a service as a flight booking service), service policy (which may include message context requirements (e.g., custom fields or filters, characteristics, whether the service is secure, etc.), service capabilities, protocol and message format requirements, etc.), a service address (e.g., a host number and a port number for services using HTTP or FTP, a JMS queue name for services using JMS, etc.), and a topic or subtopic in the forum service 138 that can be used to send messages to the service.

Figure 2:
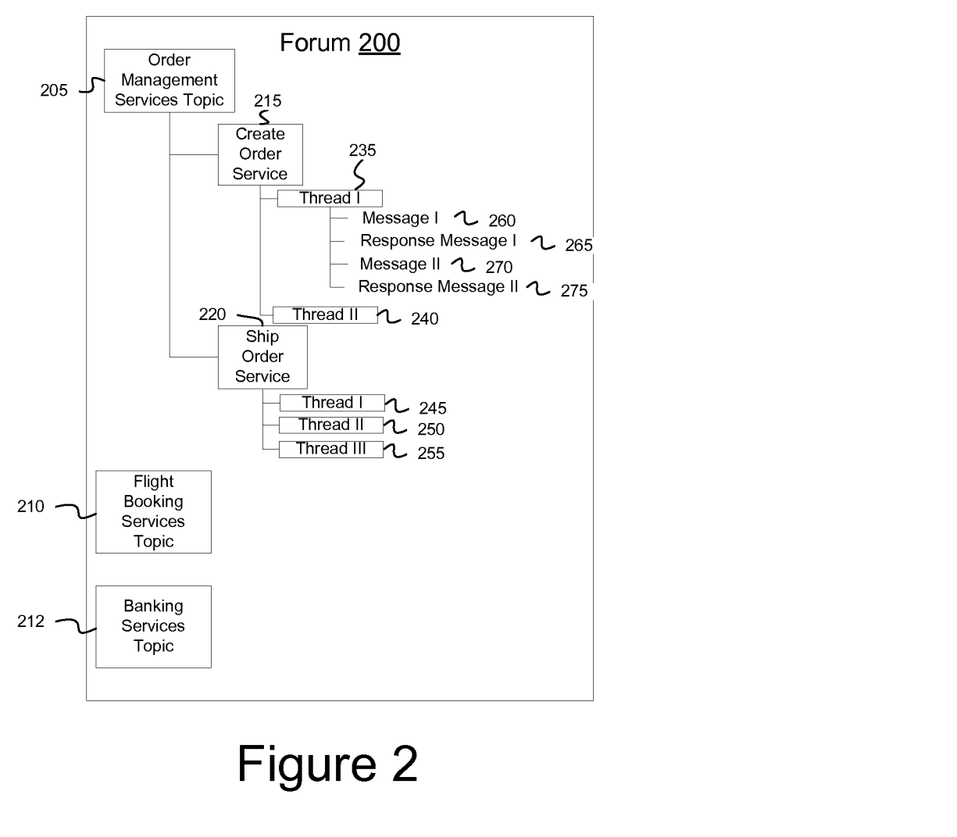
FIG. 2 illustrates an example hierarchical configuration of a forum used as a message transport in a distributed computing system, in accordance with one embodiment of the present invention.

FIG. 2 illustrates an example hierarchical configuration of a forum 200 used as a message transport in a distributed computing system, in accordance with one embodiment of the present invention. It should be understood that other hierarchical or flat arrangements of topics may also be implemented. The forum 200 in one embodiment is managed by forum service 138 of FIG. 1. In the illustrated example, the forum 200 includes an order management services topic 205, a flight booking services topic 210 and a banking services topic 212. The order management services topic 205 is shown to include a create order service subtopic 215 and a ship order service subtopic 220. Similarly, each of the flight booking services topic 210 and banking services topic 212 may have one or more subtopics (not shown).

The create order service subtopic 215 includes two threads (thread I 235 and thread II 240). Likewise, the ship order service subtopic 220 includes three threads (thread I 245, thread II 250 and thread III 255). Each of the threads may represent a single interaction or session between the service associated with the subtopic and a client (e.g., a message and response message or multiple messages and response messages that are associated with a single transaction). Alternatively, each thread may represent, for example, all of the messages between a particular client and service in a specified time period (e.g., in a day). To illustrate, thread I 215 includes message I 260, response message I 265, message II 270 and response message II 275. In an example, message I 260 may be an offer to purchase a good for a certain price. Response message I 265 may be a counter offer to sell the good at a higher price. Message II 270 may be a new offer to purchase the good for a new price. Finally, response message II 275 may be an acceptance of the offer and a confirmation that the good has been ordered.

Figure 3:
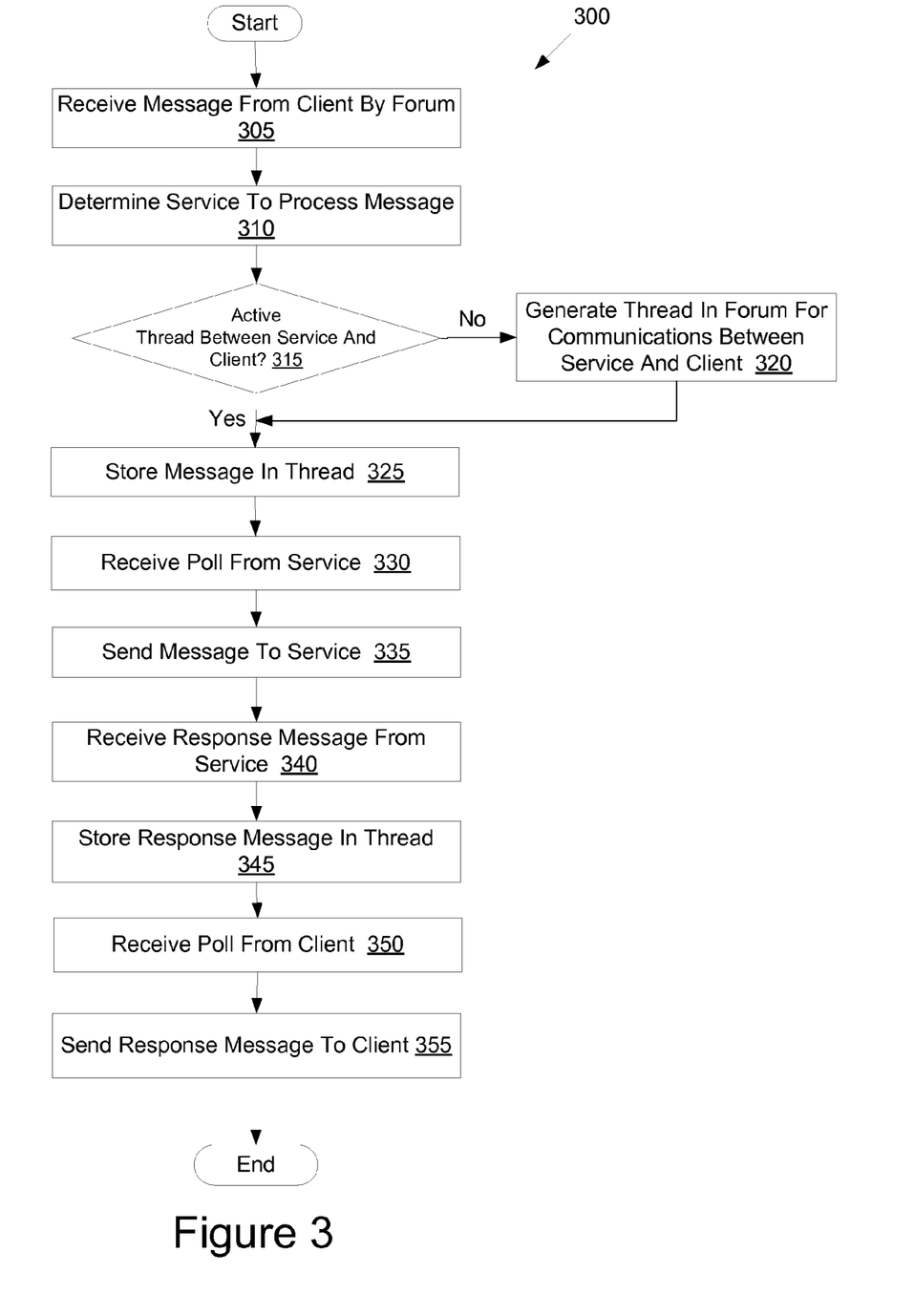
FIG. 3 illustrates a flow diagram of one embodiment for a method of using a forum as a message transport in a distributed computing system.

FIG. 3 illustrates a flow diagram of one embodiment for a method 300 of using a forum as a message transport in a distributed computing system. The method may be performed by processing logic that may comprise hardware (e.g., circuitry, dedicated logic, programmable logic, microcode, etc.), software (such as instructions run on a processing device), or a combination thereof. In one embodiment, method 300 is performed by an ESB (e.g., by a core service of an ESB, such as forum service 138 of FIG. 1).

Referring to FIG. 3, at block 305 a forum service receives a message from a client. The message may be posted to a particular topic or subtopic by the client. At block 310, the forum service determines a service that can process the message, and thereby perform a service requested by the client. If the message is posted to a forum topic associated with a particular service, then the particular service will process the message. If the message is posted to a forum topic associated with a category of service, then the forum service may select a particular service to process the message. The selection may be made randomly, based on available capacity of the services in the category, or based on other criteria.

At block 315, the forum service determines whether there is an active thread between the service and the client. An active thread may represent an active session between the service and the client, a thread established between the service and the client in the last day, etc. If there is no active thread, then the method proceeds to block 320 and a thread is generated in an appropriate topic of the forum for communication between the service and the client. The method then continues to block 325. If there is an active thread between the service and the client, the method proceeds to block 325.

At block 325, the message is stored in the thread. The message may be stored, for example, in a data store that is connected with the forum service. At block 330, the forum service is polled by the service 330. At block 335, the forum service sends the message to the service in response to the poll. At block 340, the forum service receives a response message from the service. At block 345, the forum service stores the response message in the thread. At block 350, the client polls the forum service. At block 355, the forum service sends the response message to the client. The method then ends.

In method 300, clients and services poll the forum service to determine if new messages are available for the polling service or client. However, rather than sending messages to services and clients upon being polled, the forum service may also send messages and/or message notifications to clients and services automatically (without being polled). For example, the forum service may use a publish-subscribe model to automatically send messages to clients and services as the messages are posted to the forum service, as described above with reference to FIG. 1.

Figure 4:
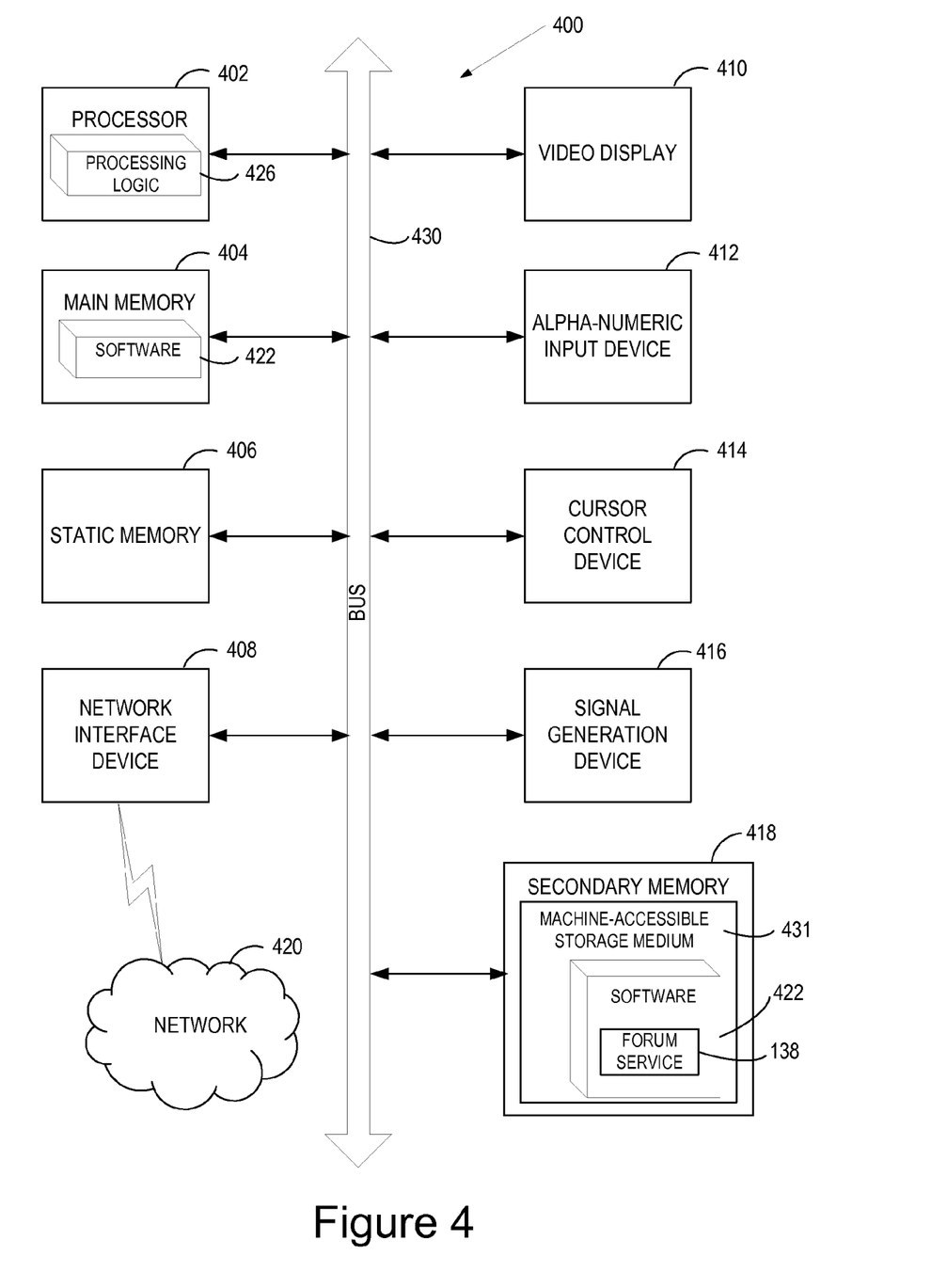
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

The machine-readable storage medium 431 may also be used to store the forum service 138 of FIG. 1, and/or a software library containing methods that call the forum service 138. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a forum service executed by a processor, a message from a client requesting an action, the forum service comprising a message transport in an enterprise service bus;
   selecting, by the forum service in view of the message, a functionality service in the enterprise service bus to perform the action in response to the message;
   generating, by the forum service, a thread in a forum managed by the forum service, the thread being generated in view of the message from the client, the thread for communications between the client and the functionality service;
   notifying, by the forum service, the functionality service of the message, wherein the functionality service is notified of the message upon the forum service being polled by the functionality service;
   receiving, by the forum service, a response message received from the functionality service, the response message comprising output generated from the action;
   storing, by the forum service, the message and the response message in the thread;
   bundling, by the forum service, the response message with an additional response message from another functionality service into a bundled communication for sending to the client; and
   notifying, by the forum service, the client of the bundled communication, wherein the client is notified of the bundled communication upon the forum service being polled by the client.

2. The method of claim 1, wherein the functionality service is notified of the message upon the message being stored in the thread, and wherein the client is notified of the response message upon the response message being stored in the thread.

3. The method of claim 1, further comprising:
   sending the message to the functionality service upon the message being stored in the thread; and
   sending the bundled communication-to the client upon the bundled communication-being stored in the thread.

4. The method of claim 1, further comprising:
   bundling the message with additional messages that are directed to the functionality service in a single communication; and
   sending the single communication to the functionality service.

5. A non-transitory computer readable storage medium including instructions that, when executed by a processor, cause the processor to perform operations comprising:
receiving, by a forum service executed by a processor, a message from a client requesting an action, the forum service comprising a message transport in an enterprise service bus;
selecting, by the forum service in view of the message, a functionality service in the enterprise service bus to perform the action in response to the message;
generating, by the forum service, a thread in a forum managed by the forum service, the thread being generated in view of the message from the client, the thread for communications between the client and the functionality service;
notifying, by the forum service, the functionality service of the message, wherein the functionality service is notified of the message upon the forum service being polled by the functionality service;
receiving, by the forum service, a response message received from the functionality service, the response message comprising output generated from the action;
storing, by the forum service, the message and the response message in the thread;
bundling, by the forum service, the response message with an additional response message from another functionality service into a bundled communication for sending to the client; and
notifying, by the forum service, the client of the bundled communication, wherein the client is notified of the bundled communication upon the forum service being polled by the client.

6. The non-transitory computer readable storage medium of claim 5, wherein the functionality service is notified of the message upon the message being stored in the thread, and wherein the client is notified of the response message upon the response message being stored in the thread.

7. The non-transitory computer readable storage medium of claim 5, the operations further comprising:
sending the message to the functionality service upon the message being stored in the thread; and
sending the bundled communication to the client upon the bundled communication-being stored in the thread.

8. The non-transitory computer readable storage medium of claim 5, the operations further comprising:
bundling the message with additional messages that are directed to the functionality service in a single communication; and
sending the single communication to the functionality service.

9. A computing system comprising:
a memory;
a processor coupled to the memory;
an enterprise service bus comprising a forum service, executable by the processor, that provides a forum as a message transport, the forum service to:
select, in view of the message, a functionality service in the enterprise service bus to perform an action in response to the message,
generate a thread in view of a message from a client, the thread for communications between the client and a functionality service,
notify the functionality service of the message in response to receipt of the message, wherein the functionality service is notified of the message upon the forum service being polled by the functionality service;
receive a response message from the functionality service, the response message comprising output generated from the action;
store the message and the response message in the thread;
bundle the response message with an additional response message from another functionality service into a bundled communication for sending to the client; and
notify the client of the bundled communication, wherein the client is notified of the bundled communication upon the forum service being polled by the client.

10. The computing system of claim 9, wherein the functionality service is notified of the message upon the message being stored in the thread, and wherein the client is notified of the response message upon the response message being stored in the thread.

11. The computing system of claim 9, the forum service to:
send the message to the functionality service upon the message being stored in the thread, and
send the bundled communication-to the client upon the bundled communication-being stored in the thread.

12. The computing system of claim 9, the forum service to:
bundle the message with additional messages that are directed to the functionality service in a single communication, and
send the single communication to the functionality service.

* * * * *